United States Patent [19]

Nichols

[11] Patent Number: 5,312,164
[45] Date of Patent: May 17, 1994

[54] VEHICLE PROPELLING MEMBER AND ASSEMBLY

[75] Inventor: Bruce M. Nichols, Miriwinni, Australia

[73] Assignee: Snowmist Pty Ltd., Queensland, Australia

[21] Appl. No.: 920,440

[22] PCT Filed: Mar. 12, 1991

[86] PCT No.: PCT/AU91/00085
§ 371 Date: Aug. 24, 1992
§ 102(e) Date: Aug. 24, 1992

[87] PCT Pub. No.: WO91/13772
PCT Pub. Date: Sep. 19, 1991

[30] Foreign Application Priority Data

Mar. 12, 1990 [AU] Australia .................. PJ9068

[51] Int. Cl.$^5$ ............................. B60B 19/00
[52] U.S. Cl. ........................ 301/5.1; 305/60; 440/90
[58] Field of Search ......... 305/60; 301/1, 5.1; 280/504; 180/7.1, 7.4; 440/90, 91, 92

[56] References Cited

U.S. PATENT DOCUMENTS 452,669  5/1991  Gram ................... 440/90 X
2,432,107 12/1947 Williams ............. 301/5.1 X

FOREIGN PATENT DOCUMENTS 2567078  1/1986  France .
2600944  1/1988  France ................. 301/5.1
WO82/02364 7/1982 PCT Int'l Appl. .
WO89/00112 1/1989 PCT Int'l Appl. .
1423448  9/1988  U.S.S.R. ................ 305/60
1408486 10/1975  United Kingdom ...... 440/90

Primary Examiner—Russell D. Stormer
Attorney, Agent, or Firm—Panitch Schwarze Jacobs & Nadel

[57] ABSTRACT

A vehicle propelling assembly to propel a vehicle in a given direction comprises a pair of propelling members (19a, 19b) each having a body portion (20a, 20b) which rotates about a rotation axis extending substantially at right angles to the direction of travel of the vehicle. Body portions (20a, 20b) extend along a plane which is substantially in alignment with the rotation axis and include a curved ground or fluid engageable portion (22a, 22b). The vehicle propelling members (19a, 19b) can be mounted to ends of an axle assembly (15) which can be secured to a vehicle through a coupling assembly comprising a ball and socket assembly (25) and connecting struts (30, 31), which are pivotally connected at one end to axle assembly (15) and at the other end to a connecting member (32) which itself is pivotally mounted for movement about a vertical axis. The coupling arrangement accommodates the various forces acting on the axle assembly upon rotation of the propelling members. The assembly can be used as a substitute for vehicle land wheels and provides increased adhesion to a ground surface. The assembly can also be used in marine applications and will also allow a vehicle to move over soft ground surfaces such as snow, mud of soft sand.

14 Claims, 3 Drawing Sheets

VEHICLE PROPELLING MEMBER AND ASSEMBLY

FIELD OF THE INVENTION

This invention relates to a vehicle propelling member and assembly which can be rotated by a drive means to propel a vehicle such as a land vehicle or water vehicle in a desired propulsion direction. The propelling member and assembly is particularly suitable although not limited to a substitute for vehicle wheels, propellers or wind vanes.

BACKGROUND ART

Vehicles are conventionally driven by one or more propelling members which themselves are driven by a drive means to result in the vehicle being driven in a desired direction.

For land vehicles, propelling members usually comprise ground engaging wheels which function to support the land vehicle from the ground and also to propel the vehicle along the ground. Ground engaging wheels for land vehicles are conventionally of a circular construction and are rotatably mounted to an axle which itself is mounted to the vehicle or to attachment thereto such as a suspension assembly. The axle generally extends at right angles to the propulsion direction of the vehicle and the vehicle wheel is mounted such that the plane along which the vehicle wheel extends is at right angles to the axle. In other words, the plane through which the vehicle wheel extends is substantially in alignment to the propulsion direction of the vehicle.

To allow land vehicles to be self-supporting there are provided wheels on each side of the vehicle. These wheels are positioned parallel relative to each other. Tracked vehicles have the same above arrangements however include an endless track extending about the vehicle wheels.

Such conventional wheels suffer from a number of disadvantages. Firstly, wheels of the above construction are generally not suitable for soft ground surfaces such as mud, snow or sand as under such conditions, the wheels tend to sink into the ground. If the wheels are of the driven type, they tend to merely spin about their axes without gripping the ground. To overcome the above disadvantage, it is known to attach various ground gripping devices to the wheels or to use endless tracks extending about the wheels to improve ground adhesion.

A second disadvantage with conventional wheels is that for vehicles having at least front or rear wheels, the rear wheels tend to follow the tracks made by the front wheels. This results in ruts being formed in the ground and with soft ground surfaces easily results in a vehicle becoming bogged. This latter problem is particularly troublesome for convoys of vehicles travelling across soft ground surfaces as the latter vehicles of the convoy find it extremely difficult to maintain adequate ground adhesion due to the ruts formed by the first vehicles.

For marine vehicles such as boats, propellers are the main method to propel the vehicle through water. The propellers typically comprise a hub portion and a number propeller blades extending radially about the hub portion. The propeller is such that the rotation axes is generally in alignment with the propulsion direction of the vehicle.

Paddle wheels are also used to propel marine vehicles and comprise a number of paddle wheel blades extending about a hub member.

A disadvantage with such propulsion units is that they are limited only to water vehicles and will not function to propel a vehicle along a ground surface. Thus, with amphibious vehicles it has hitherto been necessary to provide such vehicles with a number of land wheels of the conventional type and a marine type propeller. This is cumbersome and adds to the cost of the vehicle and the conventional land wheels suffer from the disadvantages mentioned above.

It is known to provide an amphibious vehicle only with land wheels and to provide the wheels with a particular tread pattern which provides some degree of propulsion through water. However, these vehicles are slow and cumbersome in water as the wheels have been principally designed for movement along a non-liquid surface.

It is an object of the invention to provide a propelling member and assembly which may alleviate the above mentioned disadvantages.

It is a preferred object of the invention to provide a propelling member and assembly which can be attached to vehicles to allow the vehicles to be propelled along solid ground surfaces or through water or along soft ground surfaces.

DISCLOSURE OF THE INVENTION

In one form, the invention resides in a vehicle propelling member to propel a vehicle in a given direction, said propelling member being rotatable about a rotation axis extending substantially at right angles to the given direction, said propelling member comprising a body portion extending along a plane substantially in alignment with the rotation axis, said body portion including a curved ground or fluid engageable portion.

The vehicle propelling member can be used as a substitute for vehicle wheels for land vehicles. Suitably, the propelling member is used to substitute driven wheels of the land vehicle.

The propelling member can be attached to the vehicle hub through conventional fasteners such as bolts. Alternatively, the propelling member may be directly secured to the vehicle axle or may include an axle portion to be substituted for the vehicle axle. In this fashion, the rotary propelling member can rotate about a rotation axis substantially at right angles to the propulsion direction of the vehicle.

The body portion of the propelling member may include a variety of configurations. In one form, the body portion is suitably substantially flat in configuration. Alternatively, the body portion can extend along a curved plane. The curved plane may be U-shaped or S-shaped in configuration.

Suitably, the body portion comprises a substantially circular or oval configuration. The body portion may comprise a tapered oval configuration to define a "tear drop" shape.

The body portion may be substantially continuous to define a disc or plate-like configuration. Alternatively, the body portion may comprise a plurality of elongate members which are suitably interconnected to form a rigid load supporting assembly. The elongate members may comprise rods or tubes which may be welded or otherwise affixed together. The elongate members may include struts or supports to allow the curved ground or fluid engaging portion of the body portion to be able to support the vehicle.

Suitably, the body portion is substantially flat in configuration and has an outer curved peripheral portion which defines the curved ground engageable portion. If the body portion comprises a plurality of elongate members, a peripheral elongate member may comprise the ground engageable portion. Preferably, the peripheral elongate member has a rounded surface in cross section to facilitate rotation of the propelling member along a ground surface.

The ground engageable portion may include grip enhancing members attached thereto or may include a grip enhancing profile.

The body portion may include a mounting member to facilitate mounting of the propelling member to the vehicle. The mounting member may comprise a mounting flange or plate. The mounting member may be mounted adjacent an end face of a vehicle axle or hub or may extend about the vehicle axle and be secured thereto.

If the body portion comprises a plurality of elongate members, the elongate members may be secured to the mounting member in an appropriate manner.

Suitably, a pair of propelling members are provided mounted adjacent opposed sides of the vehicle and therefore, in another form the invention resides in a vehicle propelling assembly to propel a vehicle in a given direction, said assembly comprising first and second spaced propelling members, each said propelling member being rotatable about a rotation axis substantially at right angles to the given direction and comprising a body portion extending along a plane substantially in alignment with the rotation axis, said body portion including a curved ground or fluid engageable portion., said planes along which said respective said body portions extend intersecting each other at an angle greater than 0°.

The first and second propelling members are suitably mounted to a common shaft such as an axle although it should be realised that it is possible to mount the first and second propulsion members to separate "stub" type shafts or axles. In the latter alternative, it is Preferred that the stub axles are in linear alignment.

Preferably, the first and second propelling members are mounted to a common axle and against rotation relative to each other. Preferably, the angle between the first and second propelling members is between 20-90° and most preferably the first and second propelling members extend along planes which intersect each other at 90°.

One or both of the first or second propelling members are suitably driven by a drive means. The drive means may comprise a propulsion unit of the vehicle.

The common axle on which the first and second propulsion members can be secured may include a differential. The differential is preferably of a non-slip type thereby preventing rotation of the first and second propulsion members relative to each other.

The differential is typically coupled to the vehicle propulsion unit through a longitudinal drive shaft. The drive shaft is suitably attached to the differential through a universal type connector.

The axle assembly comprising the first and second propulsion members may be secured to a vehicle through a coupling assembly allowing movement of the axle assembly in three dimensions. Suitably, the coupling assembly includes a ball and socket type connection to allow for such movement.

The ball may be attached to the axle assembly and preferably adjacent the differential and the socket may be attached to the vehicle underbody or to a first connecting strut or vice versa to secure the axle assembly to the vehicle.

Suitably, one or more connecting struts are provided to further support the axle assembly from the vehicle. Preferably, two connecting struts are provided, one on each side of the differential. Each connecting strut is suitably pivotably mounted adjacent one of its ends to the axle assembly and pivotly mounted adjacent the other of its ends to a connecting member. The connecting member may be pivotly mounted adjacent a central portion to the vehicle to pivot about a substantially vertical axes. The amount of pivotal movement may be limited by one or more stop members. The stop members may be adjustable to limit the degree of pivoting movement of the connecting member.

For marine applications, a propulsion member or a propulsion assembly may be provided adjacent sides of the marine vessel or adjacent a rear portion thereof. In this alternative, it is preferred that the body portion of each propulsion member is substantially continuous to provide maximum thrust against the water.

BRIEF DESCRIPTION OF THE DRAWING

The invention will be more clearly understood by reference to the following description of preferred embodiments thereof in which.

BEST METHOD OF PERFORMING THE INVENTION

Figure 1:
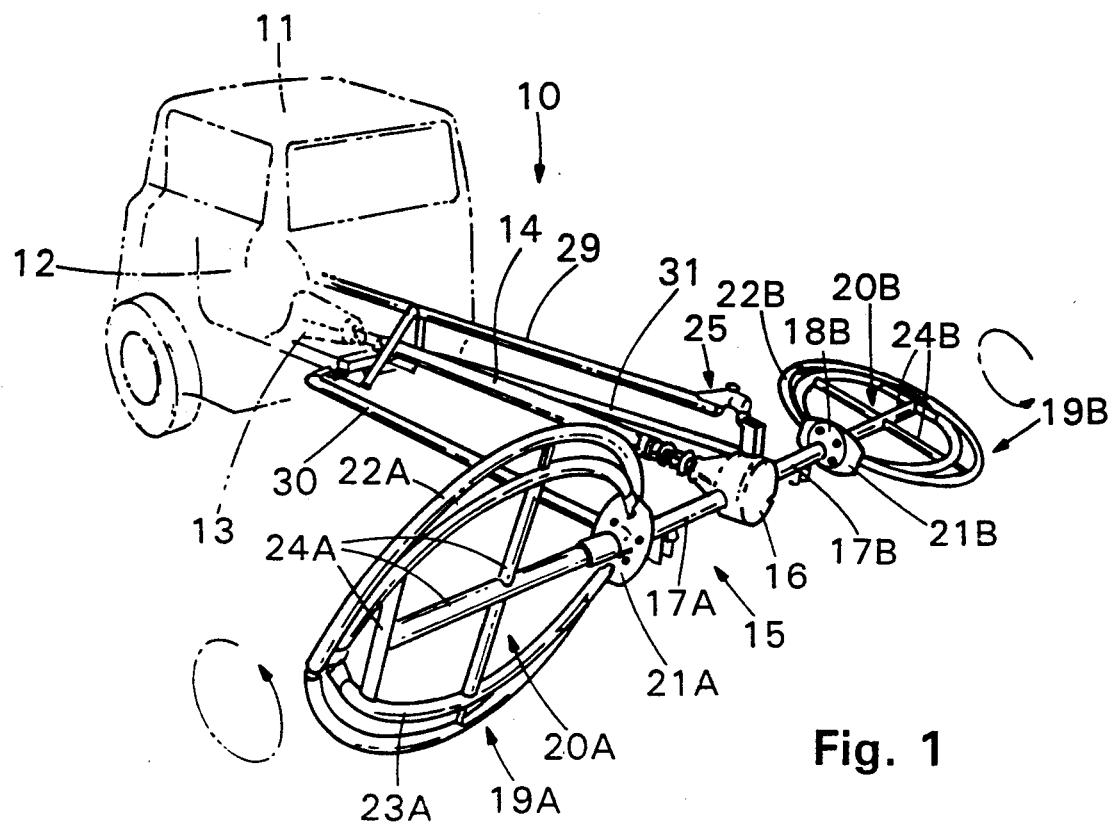
FIG. 1 is a view of a land vehicle having a propelling assembly according to the embodiment of invention.
Figure 2:
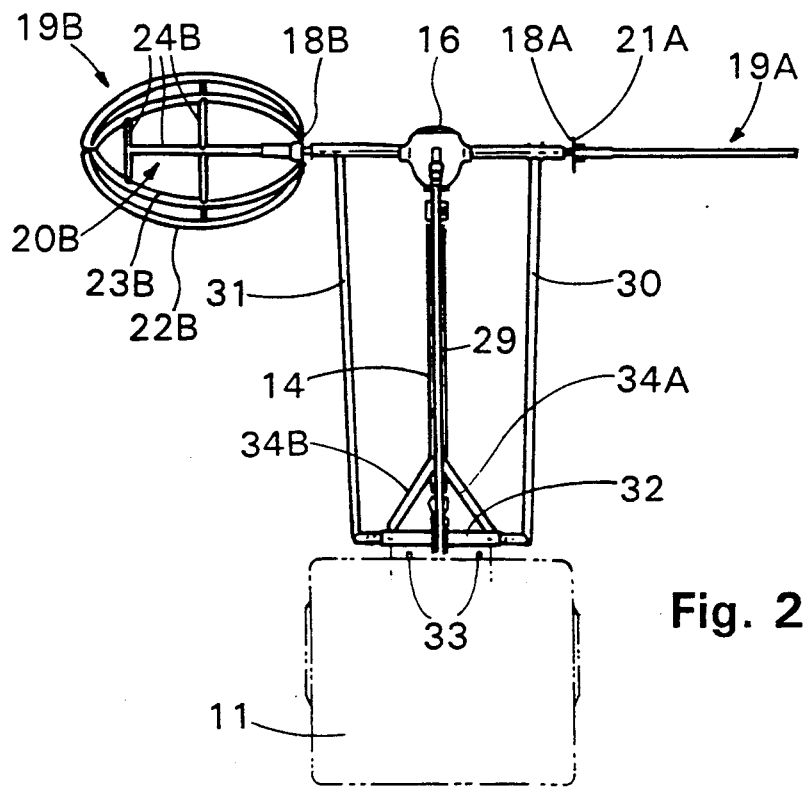
FIG. 2 is a plan view of the vehicle of FIG. 1.

Referring to FIGS. 1 and 2, there is disclosed an embodiment of the invention showing a land vehicle incorporating a pair of propelling members.

Land vehicle 10 comprises a cabin portion 11, a propulsion unit 12 typically located below cabin portion 11, gearbox 13 which is coupled to propulsion unit 12 and a longitudinal drive shaft 14. An axle assembly 15 is positioned adjacent the rear portion of vehicle 10 (the normal chassis and tray portion having been omitted from the drawings for the sake of clarity).

Axle assembly 15 comprises a differential 16 and axle portions 17a, 17b. Axle portions 17a, 17b comprise hollow tubular members through which a drive shaft (not shown) extends. One end of the drive shaft extends into differential 16 and is rotated thereby and the other end of the drive shaft includes a hub member 18a, 18b. A pair of propelling members 19a, 19b are mounted to hub members 18a, 18b through suitable fasteners such as bolts.

Propelling members 19a, 19b comprise a body portion 20a, 20b which in the embodiment is formed from a series of interconnected elongate tubes. One end of the tubes are secured to mounting means in the form of a mounting plate 21a, 21b, which mounts onto hubs 18a, 18b.

The elongate tubes comprise an outer tube 22a, 22b extending in a curved fashion to provide body portions 20a, 20b with an oval type outer configuration. Tubes 22a, 22b form the ground engageable portion of the respective body portions.

Body portions 20a, 20b further comprise inner tubes 23a, 23b and struts 24a, 24b to provide strength to the body portion.

Axle assembly 15 is mounted to vehicle 10 through a mounting assembly which compensates for the movement of axle assembly 15 during rotation of propelling members 19a, 19b.

Figure 3:
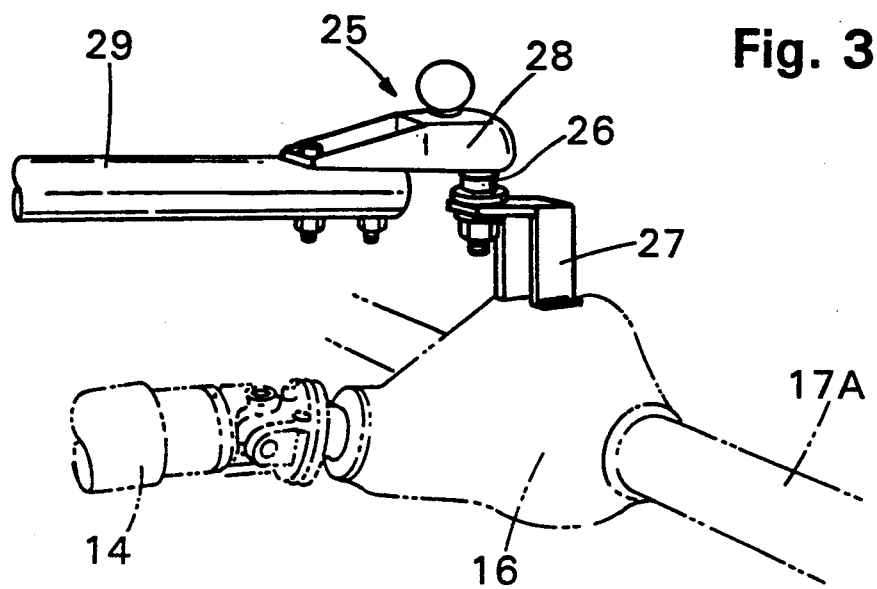
FIG. 3 is a view of a coupling assembly according to an embodiment of the invention.

The mounting assembly includes a ball and socket type coupling 25 more clearly showing in FIG. 3.

In the embodiment, the ball and socket type coupling comprises a ball 26 mounted to differential 16 through mounting plate 27 and a socket 28 which is mounted to a first connecting strut 29. First connecting strut 29 is secured to vehicle 10 adjacent cabin portion 11.

To further support axle assembly 15 to vehicle 10 there are provided second and third connecting struts 30, 31. Struts 30, 31 extend from the rear of cabin portion 11 to respective axle portions 17a, 17b and are pivotally connected at one end to axle portion 17a, 17b to be pivotably moveable about an axis substantially parallel to the rotation axes of propulsion members 19a, 19b.

The other end of second and third connecting struts 30, 31 are pivotly connected to a connecting member 32 to be pivotal about a vertical axis.

Connecting member 32 is itself pivotly mounted about a center point to be pivotable about a vertical axis. The amount of pivoting of connecting member 32 can be regulated by stop members 33 spaced to each side of the pivot point of connecting member 32.

Further reinforcement struts 34a, 34b may extend between the vehicle chasses and first connecting strut 29 to provide further rigidity.

The operation of the propelling members shall now be describe to further understand the requirement for the connecting assembly.

Propelling members 19a, 19b in the embodiment are at right angles to each other. Thus, when one of propelling members 19a, 19b is in a position substantially parallel to the ground surface, the other of the propulsion members extends substantially vertically from the ground surface.

Upon movement of the vehicle, propulsion unit 12 causes propelling members 19a, 19b to rotate about a rotational axis substantially at right angles to the propulsion direction of the vehicle.

In the embodiment, propelling member 19a contacts the ground along the lower half of ground engageable portion 22a. Upon further rotation of propelling member 19a, the upper half of ground engageable portion 22a becomes the lower half of ground engageable portion and so on. A similar situation is present for propelling member 19b except that this member is 90° out of phase with member 19a.

A consequence of this arrangement is that axle portions 17a and 17b pivot about a longitudinal axis because of the particular configuration of the propelling member. Furthermore, axle portions 17a, 17b as well as pivoting in an up and down manner also pivot about a vertical axis.

To accommodate the two types pivoting motion, it is desirable to have a universal type coupling such as the ball and socket coupling depicted in FIG. 3 and also to have the second and third connecting struts pivotally mounted at either end.

Figure 4:
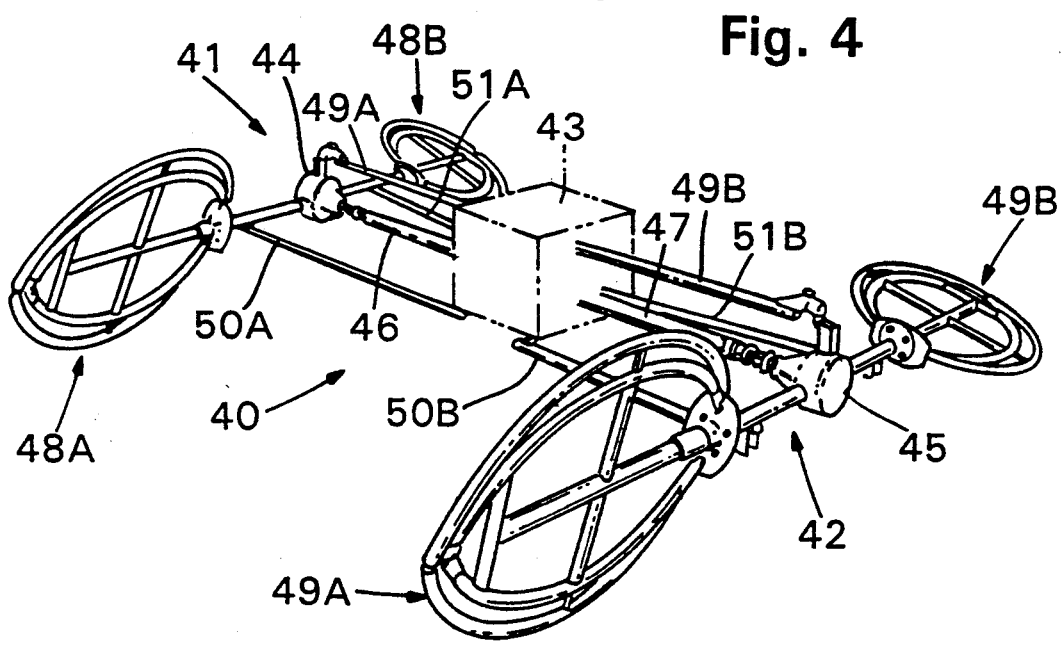
FIG. 4 is a further embodiment of the invention showing a land vehicle having propelling members according to the invention.

FIG. 4 discloses an alternative embodiment showing diagrammatically a "four wheel" drive assembly. In this embodiment, vehicle 40 includes a front axle assembly 41 and a rear axle assembly 42, and a centrally located propulsion unit 43. The vehicle chassis and cabin portion are not shown for the sake of clarity. Each axle assembly 41, 42 includes a differential 44, 45 connected to propulsion unit 43 by drive shafts 46, 47.

Four propelling members 48a, 48b, 49a, 49b are provided as opposed pairs extending from adjacent each end of a respective axle assembly.

The axle assemblies are supported by first, second and third connecting struts 49a, 49b, 50a, 50b, 51a, 51b in the manner similar to that described above.

Figure 5:
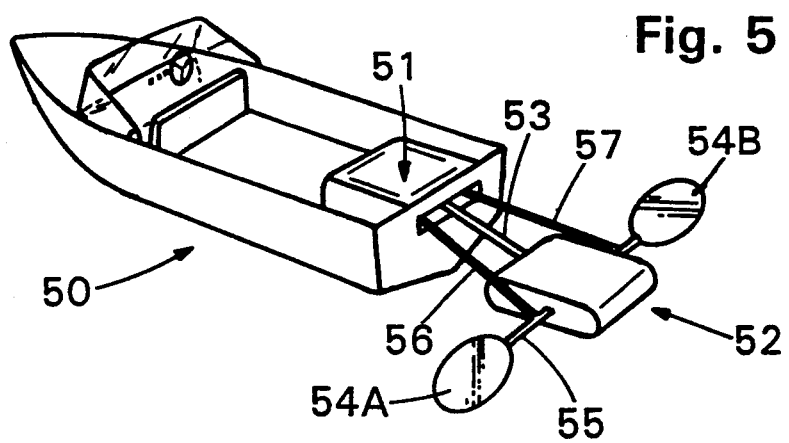
FIG. 5 is a marine vessel including a propulsion member according to the invention.

FIG. 5 shows a marine application of the invention whereby a marine vessel 50 is provided with a propulsion unit 51 which drives a differential (not shown) located within an enclosed buoyant container 52 through a drive shaft 53. Propelling members 54a, 54b are fixed to a common axle 55 and rotate thereabout. In this embodiment, the respective propulsion members are formed from a continuous material and are suitably solid to provide maximum thrust against the water. Connecting struts 56, 57 are pivotally mounted to axle 55.

Figure 6A:
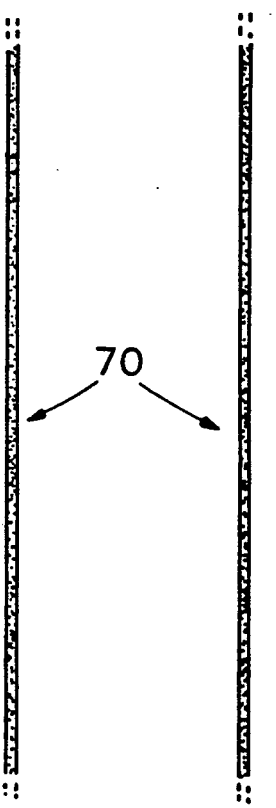
FIGS. 6a and 6b show tracks made by a conventional wheeled vehicle and a vehicle including the propelling members according to an embodiment of the invention.
Figure 6B:
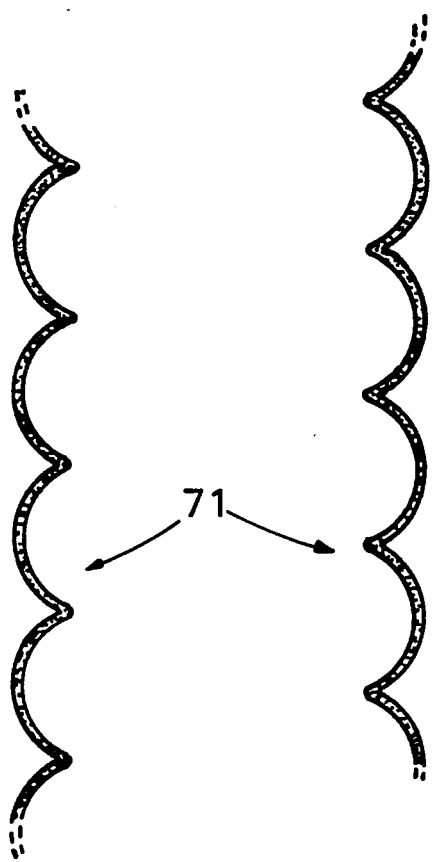

FIG. 6a and 6b show tracks left by (a) convention wheeled vehicles, and (b) a vehicle incorporating a rotating propelling assembly according to an embodiment of the invention.

The tracks left by conventional wheeled vehicles as shown in FIG. 6a result in ruts 70 forming in the ground surface which causes erosion and makes it difficult for subsequent vehicles to easily traverse the ground surface. Furthermore, such wheeled vehicles are more easily bogged as the rear wheels follow the tracks formed by the front wheels.

However, as shown in FIG. 6b, the propelling assembly according to the invention results in alternating curved formations 71 being formed in the ground surface. The particular formation minimizes erosion and it will be noted that the propelling members engage the ground along a curved line of contact which provides greater grip.

It will be seen that the propelling member and assembly according to the invention can be used on soft or boggy ground surfaces such as snow, mud and can be used in land or marine environments to provide a respective vehicle with a propulsion direction. The propelling members are not mounted parallel to each other but instead most advantageously adopt an orientation substantially perpendicular to each other to provide greatly improved ground traction and greater thrust upon rotation against a ground or water.

It will be realized that by having propelling members at right angles to each other, there will be an alternating system of one propelling member supporting the vehicle on a soft ground surface and the other propelling member providing forward thrust to the vehicle and vice versa.

The propelling member is suitable for space vehicles such as moon buggies, snow vehicles or vehicles for movement along muddy ground surfaces where conventional vehicles such as amphibious, civilian and military vehicles have no access. As an alternative the propelling members may themselves be boyant and able to capture wind which would rotate the propelling members and axle, and pull a marine vessel behind the propulsion sailing unit.

It should be realised that various other changes and modifications can be made to the embodiments described without departing from the spirit and scope of the invention as defined in the appended claims.

I claim:

1. A vehicle propelling assembly to propel a vehicle in a given direction, the assembly comprising first and second ground engaging propelling members on opposite sides of the assembly, the propelling members being rotatable about a rotation axis extending transversely to the given direction, each propelling member having a curved ground engaging contact surface which extends along a plane, the plane having an elongated axis aligned axially with the rotation axis and being rotatable around the rotation axis, the planes along which each ground engaging contact surface extends intersecting each other at an angle greater than 0°.

2. The assembly as claimed in claim 1, wherein said planes intersect each other at an angle of between 20–90°.

3. The assembly as claimed in claim 2, wherein said planes intersect each other substantially at right angles.

4. The assembly as claimed in claim 2, wherein the first and second propelling members are mounted to a common axle assembly.

5. The vehicle propelling assembly as claimed in claim 4, wherein the first and second propelling members are substantially oval in configuration.

6. The vehicle propelling assembly as claimed in claim 5, wherein each propelling member is formed from interconnected members to form a rigid load supporting propelling member assembly.

7. The vehicle propelling assembly as claimed in claim 6 including an outer curved peripheral elongate member defining the curved ground engaging contact surface.

8. The assembly as claimed in claim 1, wherein said propelling members are rotated by a drive means.

9. The vehicle propelling assembly as claimed in claim 4, wherein the common axle assembly is connected to the vehicle by a coupling assembly to allow movement of the axle assembly in three dimensions.

10. The vehicle propelling assembly as claimed in claim 9, wherein the coupling assembly includes a ball and socket assembly, one of the ball and socket being connected to the vehicle and the other of the ball and socket being connected to the axle assembly.

11. The vehicle propelling assembly as claimed in claim 10, wherein the other of the ball and socket is connected to a differential on the axle assembly.

12. The vehicle propelling assembly as claimed in claim 11, wherein the coupling assembly further includes first and second connecting struts each having two ends, one end of the first connecting strut being connected to the axle assembly on one side of the differential, and one end of the second connecting strut being connected to the axle assembly on the other side of the differential, each of the other ends of the connecting struts being pivotally mounted to a connecting member, the connecting member being connected to the vehicle.

13. The vehicle propelling assembly as claimed in claim 12, wherein the connecting member has a central portion which is pivotally mounted to the vehicle to pivot about a substantially vertical axis.

14. The vehicle propelling assembly as claimed in claim 13, wherein one or more stop members are attached to the vehicle such that the amount of pivotal movement of the connecting member is limited.

* * * * *